Patented June 15, 1954

2,681,320

UNITED STATES PATENT OFFICE 2,681,320

PERMSELECTIVE FILMS OF CATION-EXCHANGE RESINS

George W. Bodamer, Cheltenham, Pa., assignor to Rohm & Haas Company, Philadelphia, Pa., a corporation of Delaware No Drawing. Application December 23, 1950, Serial No. 202,577

13 Claims. (Cl. 260—2.2)

This invention relates to permselective films, sheets, or pellicles containing cation-exchange resins and to a process for making them.

An object of this invention is to provide films of bonded particles of cation-exchange resins, which films are permselective and are particularly adapted for use in commercial electrolytic processes and in the deionization of fluids. An object is to provide ion-exchange films which are permselective as to particles carrying a positive electric charge and which, therefore, permit the passage of cations through the films while at the same time preventing passage through the films of undesirable amounts of anions. A further object is to provide films which are strong and self-supporting and which can be handled and can be mounted on or attached to structural members, and which also are durable and remain intact in the presence of acids, bases, and salts of high or low concentrations.

The objects are accomplished by this invention which comprises uniformly and intimately dispersing a cation-exchange resin of the sulfonic or carboxylic type in a film or matrix of a polymer from the class consisting of polyethylene, polyisobutylene, vulcanized natural or synthetic rubber, polyvinyl chloride and copolymers of vinyl chloride and the vinyl esters of lower aliphatic acids. The resultant products are self-supporting films, sheets, or pellicles which are physically strong and which are like layers of cation-exchange resin, so far as their activity and utility are concerned.

Such permselective films are valuable as tools in physicochemical studies. They can also be used to great advantage in a wide variety of industrial processes. Thus, for example, the films are eminently suitable for use in an electrolytic process for making caustic soda and chlorine from a solution of sodium chloride. In one such process it is currently conventional to impose an asbestos film between the cathode and anode and to flow the brine through the electrolytic cell towards the cathode in order to minimize migration to the anode of the hydroxyl ions which are formed at the cathode. Despite these precautions some hydroxyl ions do reach the anode-zone where they form hypochlorites. But of greater significance is the fact that the sodium hydroxide which is formed in this way is contaminated by more than its own weight of sodium chloride. When, on the other hand, at least one permselective film of this invention is imposed as a barrier between the anode and cathode, the results are quite different. Due to the permselectivity of the cationic film, the hydroxyl ions are deterred from entering the anode-zone or compartment and the chloride ions are restrained from diffusing into the cathode-zone. Some slight leakage of anions across the barrier-film may occur, depending upon the porosity of the cationic film but the net result in any case is that a much more highly concentrated and much purer solution of sodium hydroxide is formed in the cathode-compartment. In fact, the amount of sodium chloride which contaminates the sodium hydroxide thus produced is of the order of only five percent. Furthermore, the quantity of hydroxyl ions which leaks through the film into the anode-compartment is negligible. Thus, the quality of the sodium hydroxide is tremendously improved, the efficiency of the process is raised and the cost of product is greatly reduced—all by the use of the new permselective cationic films. It is also noteworthy that despite the high concentration of chemicals in the process, with the caustic solution on one side of the barrier-film and the oxidizing solution on the other, the films of this invention are extremely durable.

The films are made by intimately and uniformly dispersing particles of a cation-exchange resin in a matrix or binder of a polymer from the class described above. All of these polymers are well known and are available commercially. For example, polyethylene is marketed as "Polythene." The synthetic rubbers include the polymers of butadiene-1,3, as well as the copolymers of butadiene-1,3 and other copolymerizable compounds which contain the vinylidene group, $CH_2=CH<$. Examples of suitable synthetic rubbers include the polymers of butadiene-1,3 per se, methyl-2-butadiene-1,3 (isoprene), chloro-2-butadiene-1,3 (chloroprene or neoprene) as well as the copolymers of butadiene-1,3 and styrene, known as "Buna S" or "GR–S" rubber; copolymer of butadiene-1,3 and acrylonitrile, known as "Buna N," "GR–A" or "Hycar" rubber. These synthetic rubbers, as well as natural rubber, are mixed with the particles of cation-exchange resin, formed into a sheet or film, and then vulcanized by conventional methods. The permselective films which are made from copolymers of vinyl chloride and the vinyl esters of the lower aliphatic acids which contain up to four carbon atoms, such as vinyl acetate, have unusually high ampere-efficiency but are more fragile than the films containing polyethylene or the vulcanized rubbers described above. Films made from cation-exchange resins and the above polymeric materials have a balance of physical and chemical properties which permits their successful and continued use in chemical operations where other films, such as those made from polystyrene, polymethyl methacrylate, and phenolic resins fail.

The cation-exchange resins which are incorporated in the films of this invention are those of the sulfonic and carboxylic types, many of which are available commercially. These resins include the sulfonated phenol-aldehyde products such as are described and discussed in U. S. Patents Nos. 2,184,943; 2,195,196; 2,204,539; 2,228,159; 2,228,160; 2,230,641; 2,259,455; 2,285,750; 2,319,359; and 2,361,754. Also included are the sulfonated crosslinked polymers of styrene as shown in U. S. Patent No. 2,366,007. The carboxylic resins are typified by and include those described in U. S. Patents Nos. 2,340,110 and 2,340,111 to D'Alelio. All of these resins are characterized by being insoluble and infusible and capable of sorbing cations from fluids. The resins in the films can be in the form of irregularly shaped particles, as a result of grinding, or in the form of spheroids. While the size of the particles can vary within reasonable limits, it is definitely preferred that they be small. All of the particles should be small enough to pass through a U. S. Standard sieve No. 50 and preferably through a U. S. Standard sieve No. 100.

The amount of resin in the film or sheet is an important factor since the physical properties, such as density and porosity of the film, as well as the chemical properties, such as permselectivity and the rate of migration of cations through the film, are dependent on the proportions of resin and binder in the film. The porosity, leakage, and brittleness of the film increase with an increase in the amount of resin, as does the rate of migration of cations through the film. Another consideration is the fact that the particles of resin swell in contact with the aqueous solutions and the ratio of resin to binder must be such that the film is not ruptured as the resin swells. For commercial applications—and this invention is concerned primarily with products having commercial or industrial utility—the dry resin should constitute from 25% to 75% of the total weight of the dry film.

The resin which is incorporated in the film can be in the hydrogen form or in the salt form depending upon the intended use. It should be noted that the films expand in all dimensions when the resin particles therein change from the hydrogen or acid form to the salt form. This provides a convenient way of preparing tight films having a minimum of opening or spaces between the particles and the binder, since the film can be made from resin in the hydrogen form and the resin can then be converted to the more bulky salt form by immersion of the film in a salt solution.

The most convenient methods for making the films of this invention are currently those which are customarily used in preparing sheets of rubber and plastics. Thus, for example, the resin and binder are mixed and mechanically worked on a roller mill—preferably a heated mill—and the film is then stripped from the roller. Or, a film can be sliced from a block of a mixture of resin and binder. Also, a film can be made by spraying a hot mixture of the two components by means of a flame gun. Alternatively, a suspension of the components; e. g., a latex emulsion containing the resin particles, can be laid down as a film and thereafter modified, if desired, by the application of heat and mechanical pressure. Irregularities in the films can be reduced by pressing the films in a platen press or between rollers. Other sheet-forming methods can be employed and this invention which resides in a new kind of durable, permselective, cationic film is not to be limited by the particular mechanical technique or operation by which the film is formed. What is essential is that the cation-exchange resin be evenly dispersed throughout the film and that the particles of resin extend contiguously throughout the entire thickness of film. These requirements are met when the proper ratio of essential components is employed and when the two are thoroughly, intimately, and uniformly mixed.

Herein the word "film" is used in the accepted sense as being synonymous with "sheet" or "pellicle" and as describing a thin layer of material. Thick blocks or slabs or layers can function as permselective bodies. But the products of this invention are films which are permselective and at the same time are easily prepared, handled, installed, and utilized. Films which have a thickness of about 10 to 100 mils are eminently satisfactory for most industrial applications and are preferred.

The following examples illustrate the preferred procedure by which the films of this invention are prepared.

Example 1

Fifty parts by weight of polyethylene was sheeted out on a roller mill heated to 220°–240° F. Then there was added 150 parts of a carboxylic cation-exchange resin in the hydrogen form, prepared according to the process of U. S. Patent No. 2,340,111 from 5% divinylbenzene and 95% methacrylic acid by suspension polymerization. The resin was in the form of spheroids, all of which passed through a U. S. Standard sieve No. 100. The mixture was milled at about 230° F. for one-half hour until the dispersion of the cation-exchange resin in the polyethylene binder was uniform, after which the sheet was stripped off. At room temperature it was flexible but not elastic and could be handled and fastened with clamps to an apparatus. The film was 40 mils in thickness. A sheet 12" x 24" swelled, on being soaked in water for 16 hours, to the dimensions 17" x 32" x .06".

A strip of this film was soaked in 5% solution of sodium hydroxide overnight and was then thoroughly rinsed with deionized water. This step converted the resin to the sodium- or salt-form. The resultant film was placed in an electrolytic cell as a barrier between the carbon electrodes and thus divided the cell into two compartments, an anode-compartment and a cathode-compartment. A 1.315 N solution of sodium chloride was poured into the anode-compartment and a 0.571 N solution of sodium sulfate was placed in the cathode-compartment. A current of 1.0 ampere was passed through the cell for 0.5 hour. Chlorine was liberated at the anode and sodium hydroxide was formed at the cathode. Titration of the solution in the cathode-compartment with standard acid solution showed that it was a 0.208 N solution of sodium hydroxide. Also, qualitative tests showed that no chloride ions had diffused into the cathode-compartment.

A film prepared from equal weights of polyethylene and the same cation-exchange resin was permselective and gave essentially the same results when tested in the identical manner.

Example 2

An electrolytic cell was set up as described in Example 1 above, with one change; namely, that the cathode-compartment contained a 4% solution of sodium hydroxide. A current of 0.1 ampere was passed through the cell for one hour. The increase in the amount of sodium hydroxide in the cathode-compartment was 3.0 milliequivalents. The amount of chloride ion which diffused into the cathode-compartment was only 0.16 milliequivalent which represents only about a 5% leakage, based on the amount of sodium hydroxide formed. This is far less contamination than is found when a conventional asbestos diaphragm is employed.

Example 3

A mixture of 100 parts by weight of polyethylene and 20 parts of polyisobutylene was sheeted out on a roller mill heated to 220°–240° F. Then 80 parts of a carboxylic cation-exchange resin in the hydrogen form, prepared according to the process of claim 3 of Patent No. 2,340,111 from 10% divinylbenzene and 90% methacrylic acid by suspension polymerization, was added. The mixture was milled at about 230° F. for one-half hour during which time the dispersion of the cation-exchange resin in the matrix became intimate and uniform. This film was converted into the sodium-form by the method described in Example 1 and was tested in the manner described in Example 2. While the cell was operated at 0.1 ampere for one hour, with the formation of chlorine and sodium hydroxide, the amount of leakage of chloride ion by diffusion was less than 1% based on amount of sodium hydroxide generated.

Example 4

By the procedure described in Example 3, a permselective film was made by milling, at 230° F. for an hour, 50 parts of polyethylene and 150 parts of a sulfonated copolymer of 90 parts of styrene and 10 parts of divinylbenzene, made by the process of U. S. Patent No. 2,366,007. This film in the sodium form was tested by the procedure of Example 2. This film was permeable to sodium ions but almost completely prevented diffusion of the chloride ions.

Example 5

A mixture of equal weights of a commercially available synthetic rubber made by copolymerizing butadiene and acrylonitrile and of particles of a carboxylic-type cation-exchange resin in the sodium form made by copolymerizing in suspension 5% divinylbenzene and 95% methacrylic acid was milled at room temperature for an hour together with 1% sulfur, 5% zinc oxide, and 1.5% of a commercial vulcanizing accelerator (Altex) based on the rubber. The film which was uniform in appearance was stripped from the roller and was then vulcanized at 300° F. for 45 minutes in a heated press under a pressure of 1000 lbs./sq. in. The resultant film was gray in color and elastic. It swelled in water. It was employed as a permselective film in a two-chamber electrolytic cell, the anode-chamber of which contained 10% sodium chloride while the cathode-chamber contained 4% sodium hydroxide. A current of .075 ampere and 7.2 volts was passed through the cell for two hours. The amount of sodium hydroxide in the cathode-compartment increased by .0054 equivalents. This represented an ampere-efficiency of 95%.

Example 6

In a manner similar to that described in Example 5 a permselective film was prepared by milling on a roller-mill for one hour at room temperature equal parts of "GR-S" synthetic rubber made by copolymerizing butadiene and styrene and of particles of a cation-exchange resin in the sodium form made by copolymerizing in suspension 10% of divinylbenzene and 90% of methacrylic acid. There was also milled into the film 2.5% sulfur, 1.5% of a vulcanization accelerator, and 5% zinc oxide, all based on the weight of the rubber. The film was stripped from the roller and was then vulcanized at 300° F. for 45 minutes in a heated press under a pressure of 1000 lbs./sq. in. The resultant film was gray in color, elastic, and 50 mils in thickness. It was employed in the same way as is described in Example 5 above. A total of 0.005 equivalent of sodium hydroxide was generated by the flow of a current of 0.1 ampere for two hours. This represented an ampere-efficiency of 67.4%.

Example 7

Another permselective film was made by milling and thoroughly mixing 150 parts of a copolymer of 95% vinyl chloride and 5% vinyl acetate and 150 parts of the same cation-exchange resin employed in Example 6. The milling was done on a roller mill over a period of one hour at a temperature of 300° F. and the resultant film on cooling was 50 mils in thickness and uniform in appearance. It was definitely more brittle than the films described in the above examples and for this reason is much less serviceable. The film was, however, permselective when tested in the manner described above and the ampere-efficiency was 57.6%. Another film in which a quarter of the polyvinyl resin was replaced by a linear polyester resin made from propylene glycol and sebacic acid was likewise permselective and had the additional advantage of being more flexible.

I claim:

1. A permselective, cationic pellicle comprising discrete particles of an insoluble, infusible, cation-exchange resin dispersed intimately and uniformly throughout a matrix which is a polymeric material from the class consisting of solid polyethylene, polyisobutylene, vulcanized natural rubber, vulcanized rubbery homopolymers of butadiene-1,3, vulcanized rubbery synthetic polymers of methyl-2-butadiene-1,3, vulcanized rubbery polymers of chloro-2-butadiene-1,3, vulcanized rubbery copolymers of butadiene-1,3, and styrene, vulcanized rubbery copolymers of butadiene-1,3 and acrylonitrile, polyvinylchloride, and copolymers of vinylchloride and vinyl esters of lower fatty acids, said particles being of such a size as to pass through a U. S. Standard sieve No. 50 and being present in an amount equal to 25% to about 75% of the total dry weight of said pellicle.

2. A permselective, cationic pellicle comprising discrete particles of an insoluble, infusible sulfonic cation-exchange resin dispersed intimately and uniformly throughout a matrix which is a polymeric material from the class consisting of solid polyethylene, polyisobutylene, vulcanized natural rubber, vulcanized rubbery homopolymers of butadiene-1,3, vulcanized rubbery synthetic polymers of methyl-2-butadiene-1,3, vulcanized rubbery polymers of chloro-2-butadiene-1,3, vulcanized rubbery copolymers of butadiene-1,3 and styrene, vulcanized rubbery copolymers of butadiene-1,3 and acrylonitrile, polyvinylchloride, and copolymers of vinylchloride and vinyl esters of lower fatty acids, said particles being of such a size as to pass through a U. S. Standard sieve No. 50 and being present in an amount equal to 25% to about 75% of the total dry weight of said pellicle.

3. A permselective, cationic pellicle comprising discrete particles of an insoluble, infusible carboxylic cation-exchange resin dispersed intimately and uniformly throughout a matrix which is a polymeric material from the class consisting of solid polyethylene, polyisobutylene, vulcanized natural rubber, vulcanized rubbery homopolymers of butadiene-1,3, vulcanized rubbery synthetic polymers of methyl-2-butadiene-1,3, vulcanized rubbery polymers of chloro-2-butadiene-1,3, vulcanized rubbery copolymers of butadiene-1,3 and styrene, vulcanized rubbery copolymers of butadiene-1,3 and acrylonitrile, polyvinylchloride, and copolymers of vinylchloride and vinyl esters of lower fatty acids, said particles being of such a size as to pass through a U. S. Standard sieve No. 50 and being present in an amount equal to 25% to about 75% of the total dry weight of said pellicle.

4. A permselective, cationic pellicle comprising discrete particles of an insoluble, infusible cation-exchange resin which is a sulfonated, cross-linked copolymer of styrene and divinylbenzene dispersed intimately and uniformly throughout a matrix which is a polymeric material from the class consisting of solid polyethylene, polyisobutylene, vulcanized natural rubber, vulcanized rubbery homopolymers of butadiene-1,3, vulcanized rubbery synthetic polymers of methyl-2-butadiene-1,3, vulcanized rubbery polymers of chloro-2-butadiene-1,3, vulcanized rubbery copolymers of butadiene-1,3 and styrene, vulcanized rubbery copolymers of butadiene-1,3 and acrylonitrile, polyvinylchloride, and copolymers of vinylchloride and vinyl esters of lower fatty acids, said particles being of such a size as to pass through a U. S. Standard sieve No. 50 and being present in an amount equal to 25% to about 75% of the total dry weight of said pellicle.

5. A flexible, permselective, cationic pellicle comprising discrete particles of an infusible, insoluble cation-exchange resin dispersed intimately and uniformly throughout a matrix of vulcanized natural rubber, said particles being of such a size as to pass through a U. S. Standard seive No. 50 and being present in an amount equal to 25% to about 75% of the total dry weight of said pellicle.

6. A flexible, permselective, cationic pellicle comprising discrete particles of an infusible, insoluble cation-exchange resin dispersed intimately and uniformly throughout a matrix of a vulcanized rubbery copolymer of butadiene-1,3 and styrene, said particles being of such a size as to pass through a U. S. Standard sieve No. 50 and being present in an amount equal to 25% to about 75% of the total dry weight of said pellicle.

7. A flexible, permselective, cationic pellicle comprising discrete particles of an infusible, insoluble cation-exchange resin dispersed intimately and uniformly throughout a matrix of a vulcanized rubbery copolymer of butadiene-1,3 and acrylonitrile, said particles being of such a size as to pass through a U. S. Standard seive No. 50 and being present in an amount equal to 25% to about 75% of the total dry weight of said pellicle.

8. A flexible, permselective, cationic pellicle comprising discrete particles of an infusible, insoluble cation-exchange resin dispersed intimately and uniformly throughout a matrix of a copolymer of vinyl chloride and vinyl acetate, said particles being of such a size as to pass through a U. S. Standard sieve No. 50 and being present in an amount equal to 25% to about 75% of the total dry weight of said pellicle.

9. A flexible, permselective, cationic pellicle comprising discrete particles of an infusible, insoluble cation-exchange resin dispersed intimately and uniformly throughout a matrix of solid polyethylene, said particles being of such a size as to pass through a U. S. Standard sieve No. 50 and being present in an amount equal to 25% to about 75% of the total dry weight of said pellicle.

10. A flexible, permselective, cationic pellicle comprising discrete particles of an infusible, insoluble sulfonic cation-exchange resin dispersed intimately and uniformly throughout a matrix of solid polyethylene, said particles being of such a size as to pass through a U. S. Standard sieve No. 50 and being present in an amount equal to 25% to about 75% of the total dry weight of said pellicle.

11. A flexible, permselective, cationic pellicle comprising discrete particles of an infusible, insoluble cation-exchange resin which is a sulfonated, cross-linked copolymer of styrene and divinylbenzene dispersed intimately and uniformly throughout a matrix of solid polyethylene, said particles being of such a size as to pass through a U. S. Standard sieve No. 50 and being present in an amount equal to 25% to about 75% of the total dry weight of said pellicle.

12. A flexible, permselective, cationic pellicle comprising discrete particles of an infusible, insoluble cation-exchange resin dispersed intimately and uniformly throughout a matrix of a vulcanized rubbery copolymer of butadiene-1,3 and styrene, said particles having a size no greater than 100 microns and being present in an amount equal to 50% to about 75% of the total dry weight of said pellicle.

13. A flexible, permselective, cationic pellicle comprising discrete particles of an infusible, insoluble cation-exchange resin dispersed intimately and uniformly throughout a matrix of a vulcanized rubbery copolymer of butadiene-1,3 and acrylonitrile, said particles having a size no greater than 100 microns and being present in an amount equal to 50% to about 75% of the total dry weight of said pellicle.

References Cited in the file of this patent

UNITED STATES PATENTS

| Number | Name | Date |
|---|---|---|
| 2,450,409 | Baymiller | Oct. 5, 1948 |
| 2,614,976 | Patnode et al. | Oct. 21, 1952 |
| 2,636,851 | Juda et al. | Apr. 28, 1953 |

OTHER REFERENCES

Wyllie et al., Jour. of Phys. and Colloid Chem., 54, Feb. 1950, pages 204–227.

Fisher, India Rubber Journal, January 27, 1940, pages 85–89.